(12) United States Patent
Mashimo et al.

(10) Patent No.: US 6,711,108 B2
(45) Date of Patent: Mar. 23, 2004

(54) OPTICAL DISC RECORDING APPARATUS AND MEDIUM

(75) Inventors: Akira Mashimo, Saitama-ken (JP); Yasuhide Ishimori, Saitama-ken (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 10/068,227

(22) Filed: Feb. 6, 2002

(65) Prior Publication Data

US 2002/0110066 A1 Aug. 15, 2002

(30) Foreign Application Priority Data

Feb. 13, 2001 (JP) ........................................ 2001-035920

(51) Int. Cl.⁷ ................................................. G11B 5/09
(52) U.S. Cl. .................. 369/47.53; 369/116; 369/275.2
(58) Field of Search ........................... 369/47.53, 116, 369/13.04, 275.2, 47.57; 428/64.1, 65.3

(56) References Cited

U.S. PATENT DOCUMENTS

| | | | | |
|---|---|---|---|---|
| 5,185,733 A | * | 2/1993 | Finkelstein et al. | 369/116 |
| 5,249,172 A | * | 9/1993 | Hagihara et al. | 369/116 |
| 5,648,134 A | * | 7/1997 | Shiratori et al. | 369/275.1 |
| 5,872,763 A | * | 2/1999 | Osakabe | 369/47.53 |
| 2001/0033534 A1 | * | 4/2001 | Takeda et al. | 369/47.53 |

FOREIGN PATENT DOCUMENTS

| JP | 411273074 | * 10/1999 | ............ G11B/7/00 |
|---|---|---|---|
| JP | 2000-155945 | 6/2000 | |

* cited by examiner

*Primary Examiner*—William Korzuch
*Assistant Examiner*—Kim Lien T. Le
(74) *Attorney, Agent, or Firm*—J.C. Patents

(57) ABSTRACT

An optical recording apparatus comprises a means for calculating an optimum recording power, capable of varying a recording power to perform a recording process on a test recording area of the erasable optical disc, and calculating an optimum recording power according to signals obtained by reproducing the test recording area; and an a means for calculating an optimum erasing power from the optimum recording power and a coefficient corresponding to the optimum recording power. The optimum recording power and the optimum erasing power are used for recording the erasable optical disc. Thereby, even though the dispersion of the recording power becomes large, the erasing power is not greater than a certain range; therefore, the total of the recording power and the erasing power can be restrained and the degradation of the durability, that the optical disc can be repeatedly recorded, can be suppressed.

2 Claims, 5 Drawing Sheets

| $P_{wo}$ | $\varepsilon$ | $P_{eo}$ |
|---|---|---|
| 20.00 | 0.37 | 7.40 |
| 20.50 | | 7.59 |
| 21.00 | | 7.77 |
| 21.50 | | 7.96 |
| 22.00 | | 8.14 |
| 22.50 | | 8.33 |
| 23.00 | 0.34 | 7.82 |
| 23.50 | | 7.99 |
| 24.00 | | 8.16 |
| 24.50 | | 8.33 |
| 25.00 | 0.31 | 7.75 |
| 25.50 | | 7.91 |
| 26.00 | | 8.06 |
| 26.50 | | 8.22 |
| 27.00 | | 8.37 |

OPTICAL DISC RECORDING APPARATUS AND MEDIUM

CROSS-REFERENCE TO RELATED APPLICATION

This application claims the priority benefit of Japanese application serial no. 2001-035920, filed Feb. 13, 2001.

BACKGROUND OF THE INVENTION

1. Field of the Invention

The invention relates to an optical disc recording apparatus and medium. More particularly, the invention relates to an optical disc recording apparatus and medium for an erasable optical disc.

2. Description of Related Art

The recordable optical disc, in general, comprises a write-once type disc, such as CD-R (Compact Disc-Recordable), and an erasable disc, such as CD-RW (Compact Disc-ReWritable). As shown in FIG. 5, the laser power used for the overwrite record for the erasable optical disc is varied among three values, a recording power $P_w$, an erasing power $P_e$ and a cooling power $P_c$. The recording power $P_w$ is the power to raise the temperature of a recording layer (phase-change layer) of the erasable optical disc up to its melting point, the cooling power $P_c$ is a low power for quenching the recording layer from the melting point to a temperature where the recording layer becomes an amorphous state, and the erasing power $P_e$ is the power to raise the temperature of the recording layer above a glass transition point.

During the recording process of the optical disc, an optimum recording power $P_{wo}$ and an optimum erasing power $P_{eo}$ respectively vary according to different disc types, recording apparatuses and recording speeds. Therefore, when the recording is actually performed, an operation of recording power calibration, also known as optimum power control (OPC), is performed before recording information, in order to set the optimum recording power $P_{wo}$ and the optimum erasing power $P_{eo}$ that match the disc type, the recording apparatus and the recording speed.

The conventional OPC operation of an erasable optical recording apparatus is described below. As shown in FIG. 6, a data area for storing data, and a test recording area (power calibration area, PCA) for setting an optimum recording power of the laser beam, are arranged on a recording surface of the optical disc. The PCA area is located at the most inner circumference of the optical disc, and composed of a test area and a count area, wherein the test area comprises 100 partitions and each of the partitions includes 15 frames. One OPC operation uses one partition and records a test signal by a 15-step laser power corresponding to the 15 frames. The test signal is an eight-to-fourteen modulation (EFM) signal composed of a pulse train with a time interval that is 3~11 times a base time interval T. The base time interval T is a standard speed (1×), and a period of frequency 4.32 MHz and of about 230 nsec. In addition, 9 pits with different lengths are recorded in the frame.

By illuminating the frame with the laser beam and detecting the reflecting beam from the optical disc, the test signal is reproduced and the modulation m, used as an indication for showing the amplitude of the respective reproducing RF signal, is determined. The determination of the modulation m utilizes the reproducing RF signal before AC coupling.

$$m = I_{11}/I_{top} \tag{1}$$

As shown in FIG. 7, $I_{11}$ represents a reproducing RF (radio frequency) signal from the pit and land (portions between the pit and the land) of 11T, $I_3$ represents a reproducing RF signal from the pit and land of 3T, and $I_{top}$ represents a mirror reflecting lever of the land portion. The modulation degree m varies corresponding to the recording power $P_w$. When the recording power $P_w$ is low, the modulation degree m is smaller due to the small amplitude of the reproducing RF signal. As the recording power $P_w$ becomes larger, the modulation degree m becomes large because the amplitude of the reproducing RF signal also becomes large.

When the optimum recording power $P_{wo}$ is determined by the modulation degree m, the following parameter γ calculated from the characteristic of the modulation degree m is used.

$$\gamma = (dm/dP_w) \times (P_w/m) \tag{2}$$

Namely, the parameter γ is the differential of the characteristic of the modulation degree. A target value $\gamma_{target}$ of the parameter γ is recorded in advance in the optical disc, serving as an absolute time in pregroove (ATIP) information. As shown in FIG. 8, the characteristic of the parameter γ is calculated by the equation (2) above from the characteristic of the modulation degree m, and the target value $\gamma_{target}$ is then used to calculate the target recording power $P_{target}$.

In addition, because a coefficient ρ, the ATIP information, used for calculating the optimum recording power $P_{wo}$ from the target recording power $P_{target}$ has been previously recorded, the optimum recording power $P_{wo}$ can be calculated by using the coefficient ρ according to the following equation (3).

$$P_{wo} = \rho \times P_{target} \tag{3}$$

The optimum recording power $P_{wo}$ is set to the recording power and used for recording signals. Additionally, in the following equation (4), the optimum erasing power $P_{eo}$ is set from the optimum recording power $P_{wo}$ by using a constant coefficient ε (a ratio of the erasing power over the recording power) of the ATIP information recorded in the optical disc. The cooling power $P_c$ is a constant power.

$$P_{eo} = \epsilon \times P_{wo} \tag{4}$$

In the conventional recording and erasing methods described above, the method, where the optimum recording power $P_{wo}$ is determined by the OPC operation, the optimum erasing power $P_{eo}$ is calculated by multiplying the optimum recording power $P_{wo}$ with the coefficient ε and the cooling power is a constant, uses few parameters and is easily set. However, under the combination of the optical disc and the optical pick up, recording power is affected by dispersion. Therefore, when the recording power increases, the erasing power becomes large and thus the total of the recording and erasing powers also increases. As a result, the durability, that the optical disc can be repeatedly recorded, degrades. In contrast, due to the dispersion influence on the recording power, when the recording power decreases, the erasing power also becomes small, causing a problem where the erasing property gets worse. The durability, that the optical disc can be repeatedly recorded, represents how many times the data can be recorded at the same location on the optical disc, and regarding the data being reproduced after being recorded, the durability means the recording times that both the jitter and the modulation degree m satisfy the preset specification.

SUMMARY OF THE INVENTION

Therefore, it is an object to overcome the foregoing issues by providing an optical recording apparatus and an optical recording medium. Under the combination of the optical disc and the optical pick up, even if the dispersion of the recording power becomes large, the degradation of the durability, that the optical disc can be repeatedly recorded, can be suppressed. In addition, even if the dispersion of the recording power becomes small, the erasing power is not smaller than a certain range, which prevents the erasing property from getting worse.

According to the above and other objectives, the present invention provides an optical recording apparatus used for recording an erasable optical disc, comprising a means for calculating an optimum recording power, capable of varying a recording power to perform a recording process on a test recording area of the erasable optical disc, and then calculating an optimum recording power according to signals obtained by reproducing the test recording area; and a means for calculating an optimum erasing power from the optimum recording power and a coefficient corresponding to the optimum recording power. Thereby, the optimum recording power and the optimum erasing power are used for recording the erasable optical disc. In addition, the coefficient becomes smaller when the optimum recording power becomes larger. The coefficient corresponds to the optimum recording power for setting up the optimum erasing power within a certain range.

Therefore, under the combination of the optical disc and the optical pick up, even though the dispersion of the recording power becomes large, the erasing power is not greater than a certain range; therefore, the total of the recording power and the erasing power can be restrained and the degradation of the durability, that the optical disc can be repeatedly recorded, can be suppressed. In contrast, even if the dispersion of the recording power becomes small, the erasing power is not smaller than a certain range, which prevents the erasing property from getting worse.

The invention further provides an erasable optical recording medium, having a coefficient for calculating an optimum erasing power from an optimum recording power, wherein the coefficient corresponds to the optimum recording power and is recorded on the erasable optical recording medium. The foregoing coefficient becomes smaller when the optimum recording power becomes larger. The coefficient corresponds to the optimum recording power for setting up the optimum erasing power within a certain range.

Therefore, as the optical recording medium is loaded into the optical recording apparatus, under the combination of the optical disc and the optical pick up, even though the dispersion of the recording power becomes large, the erasing power is not greater than a certain range; therefore, the total of the recording power and the erasing power can be restrained and the degradation of the durability, that the optical disc can be repeatedly recorded, can be suppressed. In contrast, even if the dispersion of the recording power becomes small, the erasing power is not smaller than a certain range, which prevents the erasing property from getting worse.

BRIEF DESCRIPTION OF THE DRAWINGS

While the specification concludes with claims particularly pointing out and distinctly claiming the subject matter which is regarded as the invention, the objectives and features of the invention and further objectives, features and advantages thereof will be better understood from the following description taken in connection with the accompanying drawings in which:

DETAILED DESCRIPTION OF THE INVENTION

Figure 1:
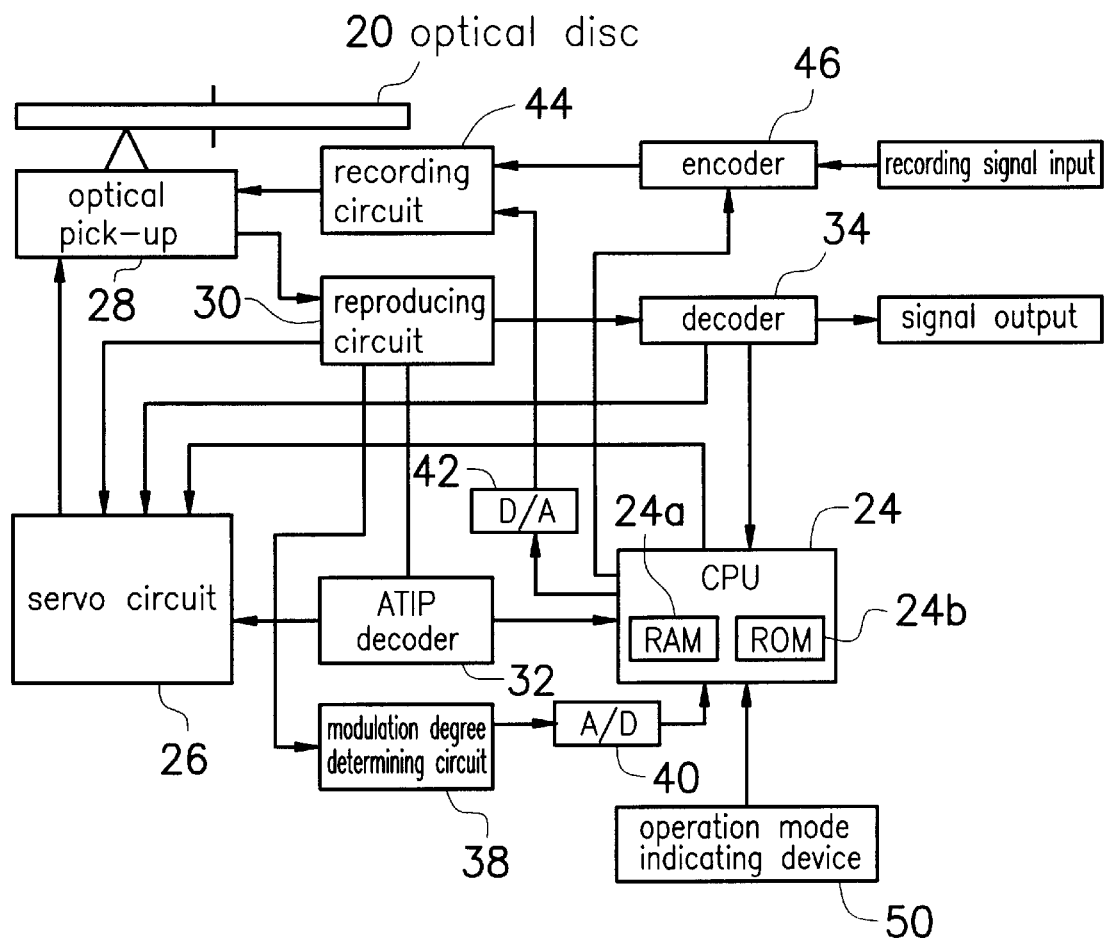
FIG. 1 shows a schematic block diagram according to one embodiment of the optical disc recording apparatus of the invention.

FIG. 1 shows a schematic block diagram according to one embodiment of the optical disc recording apparatus of the invention. As shown, the optical disc 20 rotates centered on an axis 22 driven by a spindle motor (not shown). A processor 24, for example a central processing unit (CPU), provides commands to a servo circuit 26 according to a write/read command from a high-order device.

The servo circuit 26 performs a servo control of constant linear velocity (CLV) for the foregoing spindle motor, and a rotation control for the sled motor of an optical pick up 28 so that the optical pick up 28 can move to a desired block of the optical disc 20. In addition, the servo circuit 26 also performs focusing and tracking servo controls for the optical pick up 28.

The laser beam emitted from the optical pick up 28 is reflected by the recording surface of the optical disc 20, and the reflected beam is detected by the optical pick up 28. Then, a reproducing RF signal generated by the optical pick up 28 is provided to a reproducing circuit 30. The reproducing RF signal amplified by the reproducing circuit 30 is provided to the servo circuit 26, and the reproducing circuit 30 further performs an EFM modulation to the reproducing RF signal. The ATIP signal is then separated from the modulated reproducing RF signal and then transmitted to the ATIP decoder 32. In addition, synchronized modulation signals are supplied to the decoder 34, and then outputted as reproducing data after the CIRC (cross interleaving Reed-Solomon code) decoding and the error correcting processes. The ATIP decoder 32 decodes the ATIP information, such as the ID number and various parameters, and then the decoded ATIP information is transmitted to the CPU 24 and the servo circuit 26.

Furthermore, the reproducing signal output from the reproducing circuit 30 is transmitted to the modulation degree determining circuit 38. The modulation degree determining circuit 38 is used for determining the modulation degree m of the reproducing RF signal before AC coupling. The modulation degree m is digitized by the A/D converter 40 and then transmitted to the CPU 24.

The CPU 24 generates a recording power control signal based upon the modulation degree m, and the recording power control signal is analogized by a D/A converter to provide to the recording circuit 44 as a recording power control voltage. The encoder 46 performs a CIRC encoding process on the inputted recording signals under the control of the CPU 24, and the encoded recoding signals are then transmitted to the recording circuit 44.

During recording, the recording circuit 44 performs an EFM modulation to the signal provided from the encoder 46. The modulation signal is controlled by the recording power corresponding to the recording power control voltage, which is supplied to and then drives a laser diode (LD) in the optical pick up 28. Thereby, the laser beam is illuminated on the optical disc 20 for recording signals.

Additionally, an OPC (recording power calibration) history is recorded in a memory (RAM) 24a built in the CPU 24, i.e., the optimum recording powers determined in the past are recorded. The OPC history is reserved for a certain time.

In a memory (ROM) 24b built in the CPU 24, a table setting a start power and a step power of the OPC operation corresponding to the recording speed (1, 2, 4, 6, 8, 12, 16×) for each optical disc type (the ID number), a table of the coefficient K corresponding to the recording power and the optical disc type and a table of the coefficient $\epsilon$ corresponding to the optimum recording power for each optical disc type are stored. In addition, an instruction from an operation mode indicating device 50 is input to the CPU 24.

Figure 2:
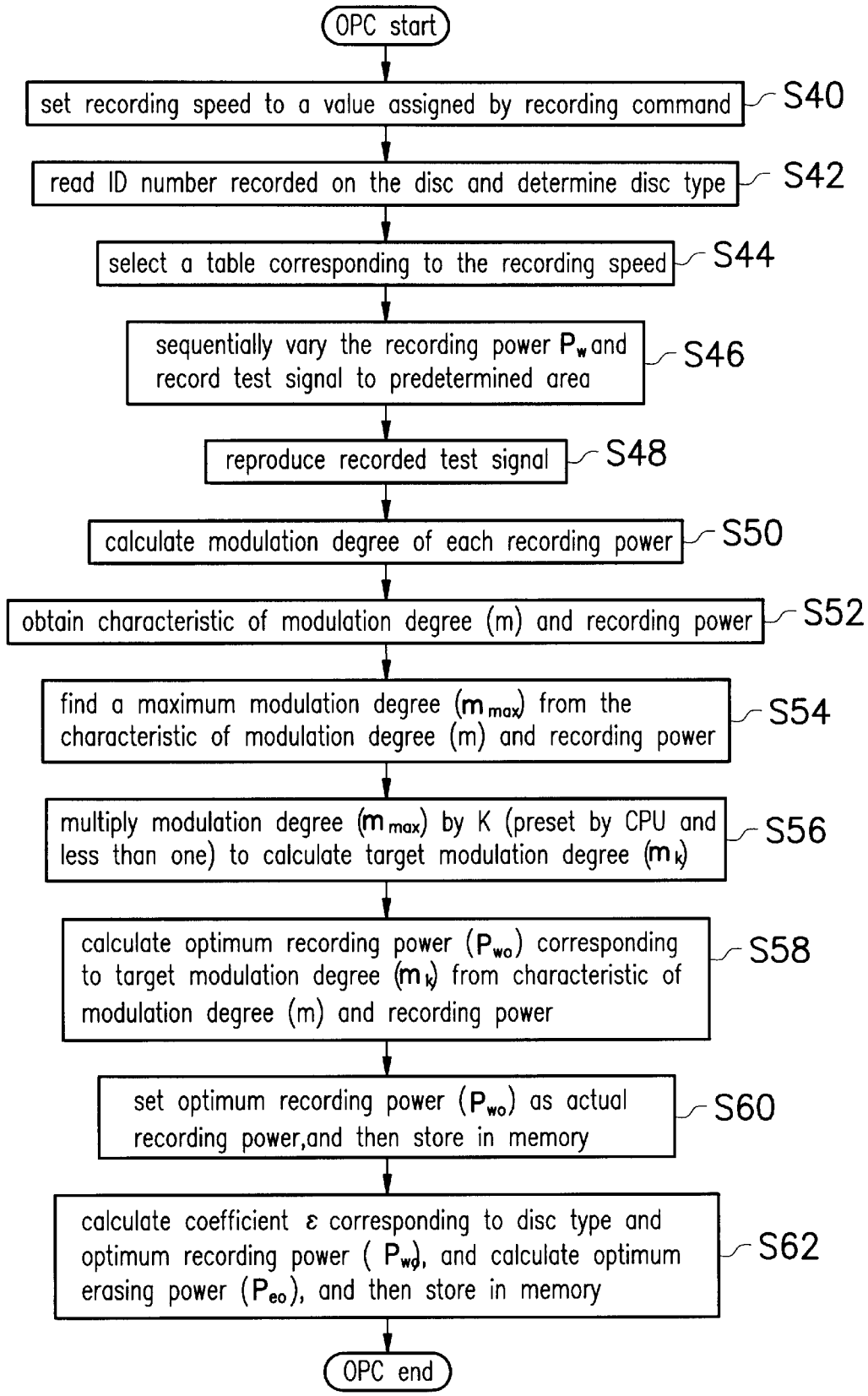
FIG. 2 schematically shows a flow chart of the CPU 24 executing the OPC operation according to the embodiment of the invention.

FIG. 2 schematically shows a flow chart of the CPU 24 executing the OPC operation according to the embodiment of the invention. As shown, at step S40, set the recording speed to a value assigned by the recording command. At step S42, read the ID number recorded as the ATIP information from the optical disc 20 for determining the type of the optical disc 20. At step S44, select a table of the start power and the step power of the OPC operation from the ROM 24b. At step 46, start the recording power from the start power set in the selected table, and then vary the recording power to 15-step powers by increasing with the step power, thereby the test signal is recorded in the test recording area.

Figures 3, 4:
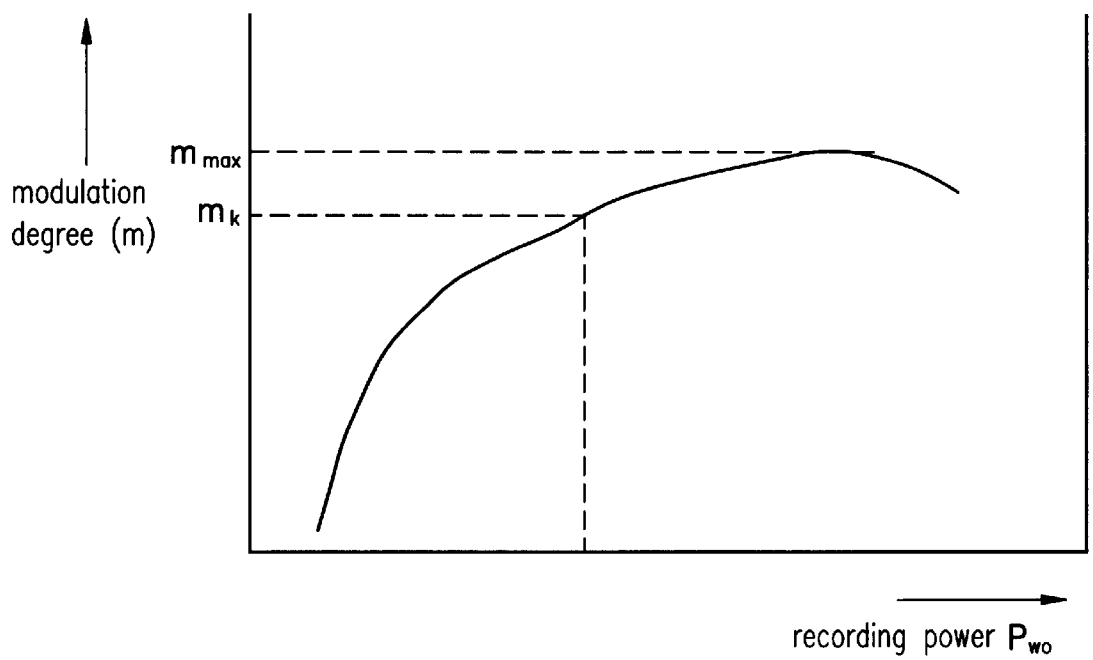
FIG. 3 schematically shows a characteristic curve between the recording power and the modulation degree according to one embodiment of the optical disc recording apparatus of the invention.
FIG. 4 shows an exemplary table of the optimum erasing power and the coefficient $\epsilon$ corresponding to the optimum recording power.
Figure 5:
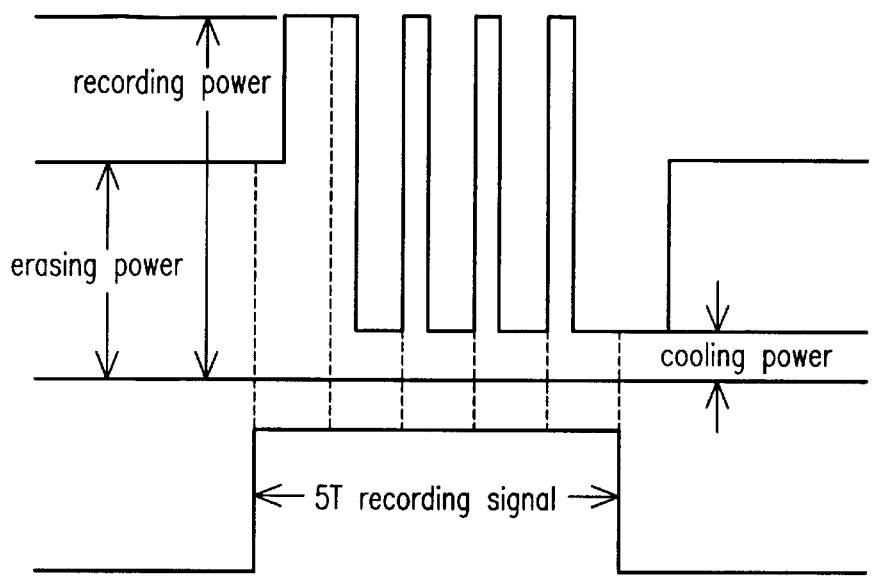
FIG. 5 shows a waveform of laser power when an overwrite recording is performed.
Figure 6:
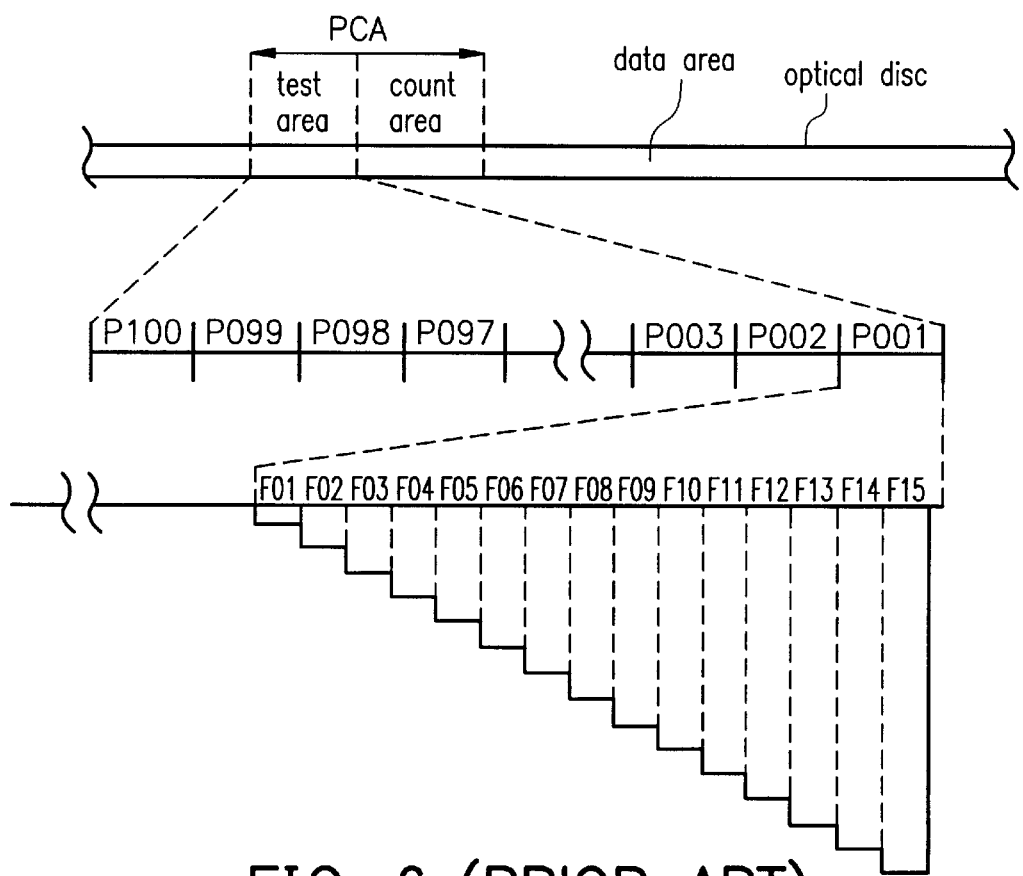
FIG. 6 shows a test recording area on the optical disc for description.
Figure 7:
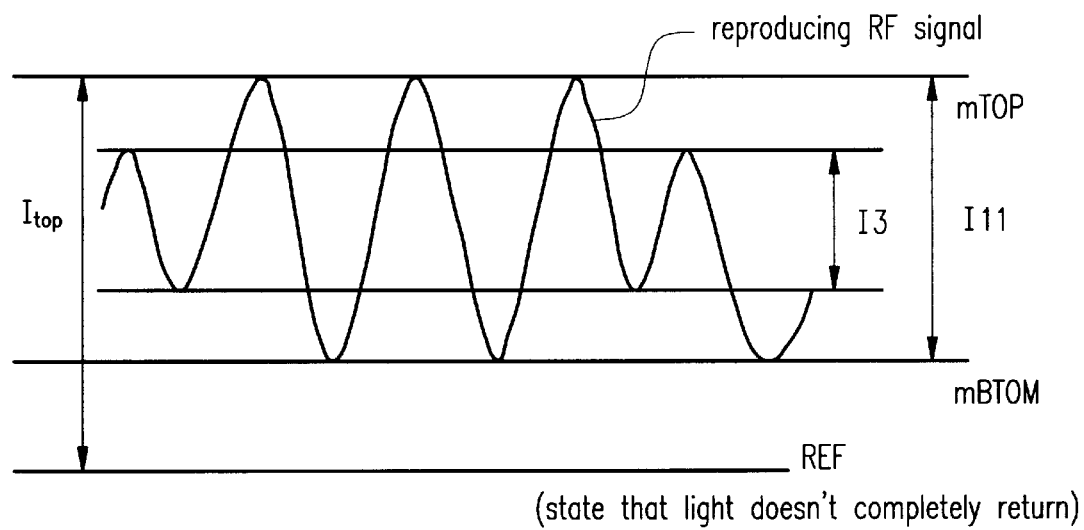
FIG. 7 shows a diagram describing the modulation degree m.
Figure 8:
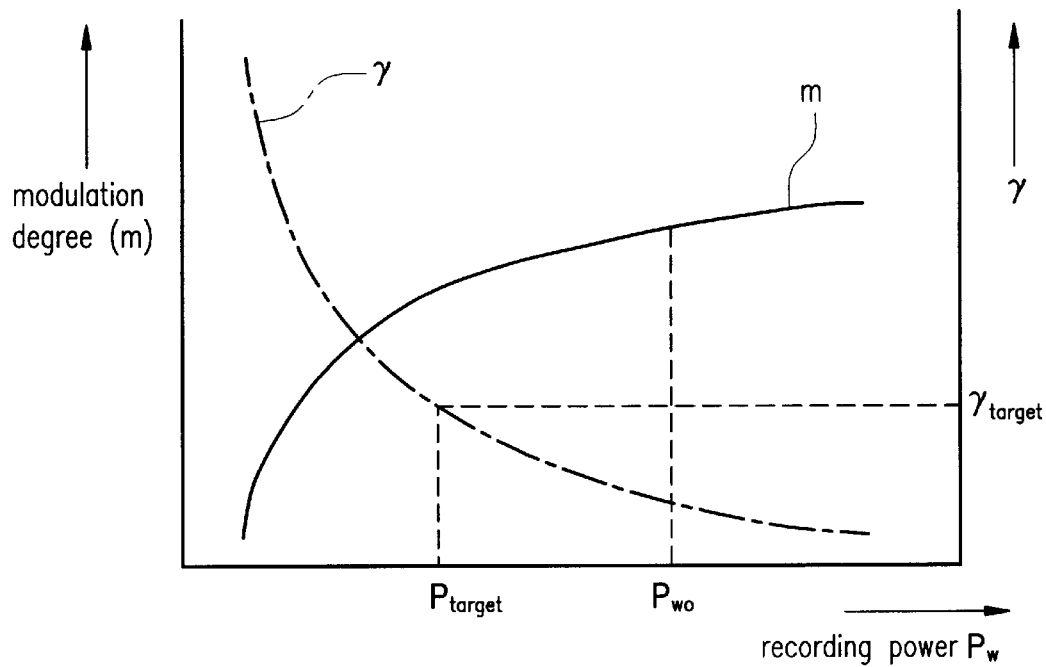
FIG. 8 shows a relationship diagram of the recording power and the modulation degree during the test recording.

At step S48, reproduce the recorded test signal, and determine the modulation degree m of each of the 15 steps of the recording powers $P_w$ at step S50. Therefore, as shown in FIG. 3, a characteristic curve of the modulation degree m depicted by the line is obtained at step S52. Next, at step S54, find a maximum modulation degree $m_{max}$, a largest value of the modulation degree m, from the characteristic curve shown in FIG. 3. At step S56, read the coefficient K corresponding to the recording speed and the optical disc type from the ROM 24b, and then multiply the maximum modulation degree $m_{max}$ with the coefficient K to calculate a target modulation degree $m_k$. The coefficient K is a real number and smaller than 1, for example a value of about 0.8.

At step S58, find an optimum recording power $P_{wo}$ corresponding to the target modulation degree $m_k$ from the characteristic curve depicted by the line shown in FIG. 3. At step S60, set the optimum recording power $P_{wo}$ to the actual recording power and then store in the RAM 24a within the CPU 24.

As shown in FIG. 3, when the recording power $P_{wo}$ is low, the modulation degree m is small because of the small amplitude of the reproducing RF signal, and when the recording power $P_{wo}$ gets large, the modulation degree m becomes large because the amplitude of the reproducing RF signal also becomes large. Because the maximum modulation degree $m_{max}$ reaches the saturation point of the modulation degree m, the dispersion due to the difference of the optical drive and the optical disc is small. In addition, because the target modulation degree $m_k$ is calculated by multiplying the maximum modulation degree $m_{max}$ with the coefficient K, the modulation degree error due to the difference of the optical drive and the optical disc is normalized by the maximum modulation degree $m_{max}$. Therefore, the modulation degree error due to the difference of the optical drive and the optical disc can be absorbed and the optimum recording power $P_{wo}$ can be precisely determined.

Referring to FIG. 2 again, at step S62, read the coefficient $\epsilon$ corresponding to the optimum recording power $P_{wo}$ set according to the step S60 and the optical disc type from the table stored in the ROM 24b, and then multiply the optimum recording power $P_{wo}$ with the coefficient $\epsilon$ to calculate the optimum erasing power $P_{eo}$. The optimum erasing power $P_{eo}$ is set to the erasing power and stored in the RAM 24a in the CPU 24. In addition, the cooling power Pc is set to a constant power. As the OPC operation is finished, the recording operation starts.

FIG. 4 shows a table of the optimum erasing power, the optimum recording power and the coefficient $\epsilon$ corresponding to the optimum recording power. As shown in FIG. 4, for one specified optical disc type, the recording power $P_{wo}$ is set between 20.00 and 27.00. In this example, the coefficient $\epsilon$ is 0.37 when the recording power $P_{wo}$ is within a range from 20.00 to less than 23.00; the coefficient $\epsilon$ is 0.34 when the recording power $P_{wo}$ is within a range from 23.00 to less than 25.00; and the coefficient $\epsilon$ is 0.31 when the recording power $P_{wo}$ is within a range from 25.00 to less than 27.00. As a result, the optimum erasing powers $P_{eo}$ corresponding to the optimum recording powers $P_{wo}$ are listed at the right column.

As described above, the coefficient $\epsilon$ gets small as the optimum recording power $P_{wo}$ gets large. Because the optimum erasing power $P_{eo}$ is calculated from the optimum recording power $P_{wo}$ and the coefficient $\epsilon$, under the combination of the optical disc and the optical pick up, even if the recording power becomes large due to the dispersion influence on the recording power, the erasing power is not larger than a certain range; therefore, the total of the recording power $P_{wo}$ and the erasing power $P_{eo}$ can be restrained, and the degradation of durability that the optical disc can be repeatedly recorded can be suppressed as well. In addition, if the erasing power $P_{eo}$ is larger than a predetermined value that raises the temperature of the recording layer of the optical disc over the glass transferring point, a power larger than that value doesn't change the erasing property very much. Therefore, an effective erasing property around the predetermined value can be obtained.

Similar to the table shown in FIG. 4, in the optical recording medium of the invention, the coefficient $\epsilon$ that serves as the ATIP information and is used for calculating the optimum erasing power $P_{eo}$ from the optimum recording power $P_{wo}$ corresponds to the optimum recording power $P_{wo}$ and is recorded. Therefore, according to the optical disc recording apparatus of the invention, the table of the optimum recording power $P_{wo}$ and the coefficient $\epsilon$ is read from the optical recording medium, and then stored in the RAM 24a. After performing the OPC operation for calculating the optimum recording power $P_{wo}$, the most suitable coefficient $\epsilon$ can be found by referring to the table stored in the RAM 24a with the optimum recording power $P_{wo}$. The optimum erasing power is then calculated by using the optimum recording power $P_{wo}$ and the most suitable coefficient $\epsilon$. In addition, the optical recording medium can also record the foregoing table on each recording apparatus.

In the foregoing embodiment, although the optimum recording power Pwo is obtained from the target modulation degree $m_k$, the invention can be also applied to the conventional method that calculates the recording power $P_{target}$ from the characteristic curve of the parameter γ and then uses the coefficient ρ to calculate the optimum recording power $P_{wo}$, which is not restricted in the invention. In addition, the table shown in FIG. 4 can be also set for each recording speed.

The steps S40~S60 discussed above correspond to the optimum recording power calculating device defined in claims, and the step S62 corresponds to the optimum erasing power calculating device defined in the claims.

As described above, the optical recording apparatus of the invention comprises a means for calculating an optimum recording power, capable of varying a recording power to perform a recording process on a test recording area of the erasable optical disc, and calculating an optimum recording power according to signals obtained by reproducing the test recording area; and a means for calculating an optimum erasing power from the optimum recording power and a coefficient corresponding to the optimum recording power. The optimum recording power and the optimum erasing power mentioned above are used for recording the erasable optical disc. In addition, the coefficient becomes smaller when the optimum recording power becomes larger. Therefore, under the combination of the optical disc and the optical pick up, even though the dispersion of the recording power becomes large, the erasing power is not greater than a certain range; therefore, the total of the recording power and the erasing power can be restrained and the degradation of the durability, that the optical disc can be repeatedly recorded, can be suppressed. In contrast, even if the dispersion of the recording power becomes small, the erasing power is not smaller than a certain range, which prevents the erasing property from getting worse.

Furthermore, the erasable optical recording medium of the invention has a coefficient for calculating an optimum erasing power from an optimum recording power, wherein the coefficient corresponds to the optimum recording power and is recorded on the erasable optical recording medium. The coefficient becomes smaller when the optimum recording power becomes larger. As the optical recording medium is loaded into the optical recording apparatus, under the combination of the optical disc and the optical pick up, even though the dispersion of the recording power becomes large, the erasing power is not greater than a certain range; therefore, the total of the recording power and the erasing power can be restrained and the degradation of the durability, that the optical disc can be repeatedly recorded, can be suppressed. In contrast, even if the dispersion of the recording power becomes small, the erasing power is not smaller than a certain range, which prevents the erasing property from getting worse.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed:

1. An optical disc recording apparatus, for recording an erasable optical disc, the apparatus comprising:

a memory unit for previously storing a table comprising a plurality of coefficients each corresponding to a prescribed range of optimum recording powers for each of optical disc types, wherein each of the coefficients is a constant for the prescribed range of optimum recording powers, and the coefficient gets smaller for a next range larger than the prescribed range;

means for calculating an optimum recording power, capable of varying a recording power to perform a recording process on a test recording area of the erasable optical disc, and calculating the optimum recording power according to signals obtained by reproducing the test recording area; and means for calculating an optimum erasing power from the optimum recording power, wherein a coefficient is read from the plurality of coefficients stored in the memory unit, and the read coefficient is corresponding to the erasable optical disc type and the optimum recording power calculated by the means for calculating an optimum recording power, and wherein the optimum erasing power is obtained by multiplying the optimum recording power with the read coefficient, and wherein the optimum recording power and the optimum erasing power are used for actually recording the erasable optical disc.

2. An erasable optical recording medium, having a plurality of coefficients that is previously stored in the erasable optical recording medium and each of the coefficients corresponds to a prescribed range of optimum recording powers, wherein each coefficient is used for obtaining an optimum erasing power by multiplying the optimum recording power, and wherein each of the coefficients is a constant for the prescribed range of optimum recording powers, and the coefficient gets smaller for a next range larger than the prescribed range.

* * * * *